United States Patent Office 3,845,206
Patented Oct. 29, 1974

3,845,206
INSECTICIDAL AND FUNGICIDAL COMPOSITIONS CONTAINING 1-O,O-DIETHYLTHIO-PHOSPHONYL-INDAZOLES
Michel Sauli, Paris, France, assignor to Rhone-Poulenc S.A., Paris, France
No Drawing. Original application Jan. 23, 1970, Ser. No. 5,347, now Patent No. 3,763,180. Divided and this application Jan. 29, 1973, Ser. No. 327,317
Claims priority, application France, Jan. 27, 1969, 6901549; Oct. 22, 1969, 6936237
Int. Cl. A01n 9/36
U.S. Cl. 424—200                    10 Claims

ABSTRACT OF THE DISCLOSURE

Organophosphorus compounds of the formula:

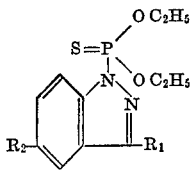

wherein $R_1$ represents halogen, alkyl of 1 through 4 carbon atoms, phenyl, cyano, carbamoyl or thiocarbamoyl, and $R_2$ represents hydrogen, halogen or nitro, possess useful insecticidal properties in particular against *diptera, coleoptera, lepidoptera, hemiptera* and *orthoptera*, and fungicidal properties, in particular against cucumber mildew and wheat rust.

---

This is a division, of application Ser. No. 5,347, filed Jan. 23, 1970, now Pat. No. 3,763,180.

This invention relates to new organophosphorus compounds, to a process for their preparation, and compositions containing them.

The new organophosphorus compounds of the present invention are those of the general formula:

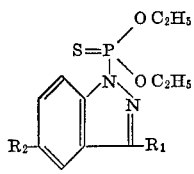

wherein $R_1$ represents a halogen (preferably chlorine) atom, an alkyl radical containing 1 to 4 carbon atoms, or a phenyl, cyano, carbamoyl or thiocarbamoyl radical, and $R_2$ represents a hydrogen or halogen (preferably chlorine) atom or a nitro radical.

According to a feature of the invention, these organophosphorus compounds are obtained by the process which comprises reacting O,O-diethylchlorothiophosphate with an indazole derivative of the general formula:

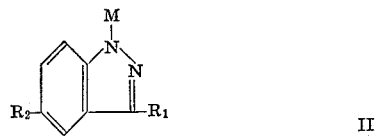

wherein M represents a hydrogen or alkali metal atom, and $R_1$ and $R_2$ are as hereinbefore defined. Preferably the symbol M in formula II represents an alkali metal atom, the alkali metal derivative of the indazole being, if desired, prepare *in situ*.

The reaction is preferably carried out in aprotic polar solvent such as 2 - N - methylpyrrolidine, dimethylformamide, hexamethylphosphotriamide, or dimethylsulphoxide at a temperature between 0° and 30° C.

The indazoles of general formula II when M represents a hydrogen atom can be obtained according to one of the methods described in "The Chemistry of Heterocyclic Compounds (Pyrazoles, Pyrazolines, Pyrazolidines, Indazoles and Condensed Rings), A Weissberger, Edit. Interscience Publishers, Part 3, 289–382 (1967)."

The indazoles of general formula II when M represents an alkali metal may be prepared by known methods from the corresponding indazoles of general formula II wherein M represents a hydrogen atom, for example by treatment with an alkali metal (e.g. potassium) alkoxide, such as an ethoxide, in an alcohol, e.g. ethanol.

The new organophosphorus compounds of general formula I have remarkable insecticidal and fungicidal properties. As insecticides, they are effective through contact and by direct ingestion. They have proved particularly active against *diptera, coleoptera, lepidoptera, hemiptera* and *orthoptera*. As fungicides they are particularly active against cucumber mildew (*Erysiphe cichoracearum*) and against wheat rust (*Puccinia graminis*). Preferred compounds are those in which $R_1$ represents a halogen atom or a cyano radical and $R_2$ represents a hydrogen or halogen atom, and in particular 1 - O,O - diethyl - thiophos-3,5-dichloroindazole and 1 - O,O - diethyl - thiophosphonyl-3-cyanoindazole.

According to a further feature of the present invention, there are provided insecticidal and fungicidal compositions containing, as the active ingredient, at least one organophosphorus compound of formula I in association with one or more diluents or adjuvants compatible with the organophosphorus compound(s) and suitable for use in agricultural insecticidal and fungicidal compositions. Preferably the compositions contain between 0.005% and 80% by weight of phosphorus compound.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the phosphorus compound with the solid diluent, or by impregnating the solid diluent with a solution of the phosphorus compound in a volatile solvent, evaporating the solvent, and if necessary grinding the product so as to obtain a powder.

Instead of a solid diluent, there may be used a liquid in which the phosphorus compound is dissolved or dispersed. The compositions may thus take the form of suspensions, emulsions or solutions in organic or aqueous-organic media, for example acetophenone, aromatic hydrocarbons such as toluene or xylene or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the phosphorous compounds may be used in the form of self-emulsifying concentrates containing the active substance dissolved in the emulsifying agent or in a solvent containing an emulsifying agent compatible with the phosphorus compound and solvent, a simple addition of water to such concentrates producing compositions ready for use.

The organophosphorus compounds of general formula I are preferably employed in a quantity of 5 to 200 g. per hectolitre of water when they are used as insecticides and in a quantity of 50 to 200 g. per hectolitre of water when they are used as fungicides.

The following Examples illustrate the invention.

EXAMPLE 1

A 20% (weight/volume) solution of potassium ethoxide in ethanol (23.4 cc.) is added to a suspension of 3,5-dichloroindazole (11.2 g.) in ethanol (100 cc.). The ethanol is evaporated under reduced pressure and the residue is taken up in 2-N-methylpyrrolidone (150 cc.) and, after cooling to 10° C., O,O-diethylchlorothiophosphate (11.3 g.) is added. The reaction mixture is left to stand for 15 hours and is then poured into distilled water (1500 cc.). The oil which separates is extracted with methylene chloride (400 cc.), and the resulting solution is successively washed with distilled water (200 cc.), a 4% (weight/volume) sodium hydroxide solution (200 cc.) and distilled water (200 cc.). After drying over anhydrous sodium sulphate, treating with decolourising charcoal and concentrating under reduced pressure, 1-O,O-diethylthiophosphonyl-3,5-dichloroindazole (14 g.) is obtained in the form of an oil ($n_D^{20}$=1.5718).

3,5-Dichloroindazole, m.p. 244° C., employed as starting material can be prepared according to the method described by K. Auwers *et al.*, Ber. 55, 1141 (1922).

By following the same procedure and starting with appriate indazole derivatives of formula II, there are obtained the following products:

1-O,O-diethylthiophosphonyl-3-chloroindazole, an oil: $n_D^{20}$=1.5679;
1-O,O-diethylthiophosphonyl-3-chloro-5-nitroindazole, m.p. 35° C., and
1-O,O-diethylthiophosphonyl-3-cyanoindazole, an oil: $n_D^{20}$=1.5618.

EXAMPLE 2

A 20% (weight/volume) solution of potassium ethoxide in ethanol (21 cc.) is added to a solution of 3-carbamoyl-5-nitroindazole (10.5 g.) in 2-N-methylpyrrolidone (100 cc.). The ethanol is evaporated under reduced pressure and, after cooling to 5° C., O,O-diethylchlorothiophosphate (10.3 g.) is added. The reaction mixture is left to stand for 15 hours and is then poured into distilled water (700 cc.). The resulting precipitate is filtered off and washed on the filter with distilled water (3×100 cc.). After drying and recrystallisation of the precipitate from ethanol, 1 - O,O-diethylthiophosphonyl-3-carbamoyl-5-nitroindazole (9 g.), m.p. 176° C., is obtained.

By following the same procedure and starting with appropriate indazole derivatives of formula II, there are obtained the following products:

1-O,O-diethylthiophosphonyl-3-thiocarbamoylindazole, m.p. 32–33° C.;
1-O,O-diethylthiophosphonyl-3-phenylindazole, an oil: $n_D^{20}$=1.5900;
1-O,O-diethylthiophosphonyl-3-methylindazole, an oil: $n_D^{20}$=1.5422, and
1-O,O-diethylthiophosphonyl-3-carbamoyl-5-chloroindazole, m.p. 122° C.

3-Carbamoyl-5-nitroindazole, which melts above 300° C., can be prepared by the action of nitric acid on 3-cyanoindazole in solution in sulphuric acid.

3-Thiocarbamoylindazole, m.p. 225° C., can be prepared by the action of hydrochloric acid and O,O-diethyldithiophosphoric acid on 3-cyanoindazole in solution in benzene.

3-Carbamoyl-5-chloroindazole, m.p. 300° C., can be prepared by the action of sulphuric acid on 3-cyano-5-chloroindazole, m.p. 172° C., itself obtained by the action of sodium chlorate on 3-cyanoindazole in solution in acetic acid.

EXAMPLE 3

A condensation product of octylphenol and ethylene oxide containing 10 moles of ethylene oxide per mole of octylphenol (10 parts by weight) is added to a solution of 1 - O,O-diethylthiophosphonyl-3-chloro-5-nitroindazole (25 parts by weight) in a mixture of equal parts (by volume) of toluene and acetophenone (65 parts by volume). The resulting solution is used, after dilution with water in the ratio of 200 cc. of this solution per 100 litres of water, to destroy flies and mosquitoes or caterpillars such as *Plutella maculipennis* on vegetable crops.

I claim:

1. An insecticidal and fungicidal composition comprising, as the active ingredient, an organophosphorus compound of the formula:

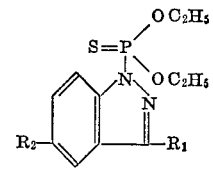

wherein $R_1$ represents halogen, alkyl of 1 through 4 carbon atoms, phenyl, cyano, carbamoyl or thiocarbamoyl, and $R_2$ represents hydrogen, halogen or nitro, in association with at least one diluent or adjuvant compatible with the organophosphorus compound and suitable for use in agricultural insecticidal and fungicidal compositions, the quantity of organophosphorus compound in the composition being between 0.005% and 80% by weight of the composition.

2. The composition of Claim 1 wherein the active ingredient is 1-O,O-diethylthiophosphonyl-3,5-dichloroindazole.

3. The composition of Claim 1, wherein the active ingredient is 1-O,O-diethylthiophosphonyl-3-cyanoindazole.

4. The composition of Claim 1 wherein the active ingredient is 1-O,O-diethylthiophosphonyl-3-chlorindazole.

5. The composition of Claim 1 wherein the active ingredient is 1-O,O-diethylthiophosphonyl-3-chloro-5-nitroindazole.

6. The composition of Claim 1 wherein the active ingredient is 1-O,O-diethylthiophosphonyl-3-carbamoyl-5-nitroindazole.

7. The composition of Claim 1 wherein the active ingredient is 1-O,O-diethylthiophosphonyl-3-thiocarbamoylindazole.

8. The composition of Claim 1 wherein the active ingredient is 1-O,O-diethylthiophosphonyl-3-phenylindazole.

9. The composition of Claim 1 wherein the active ingredient is 1-O,O-diethylthiophosphonyl-3-methylindazole.

10. The composition of Claim 1 wherein the active ingredient is 1 - O,O-diethylthiophosphonyl-3-carbamoyl-5-chloroindazole.

References Cited
UNITED STATES PATENTS 3,681,464   8/1972   Rufenacht _____ 424—200

ALBERT T. MEYERS, Primary Examiner

L. SCHENKMAN, Assistant Examiner